United States Patent
Holm et al.

(10) Patent No.: US 9,756,434 B2
(45) Date of Patent: Sep. 5, 2017

(54) METHOD OF OPERATING A BINAURAL HEARING AID SYSTEM AND A BINAURAL HEARING AID SYSTEM

(71) Applicant: Widex A/S, Lynge (DK)

(72) Inventors: Henrik Holm, Copenhagen (DK); Jan Hesselballe, Soborg (DK)

(73) Assignee: Widex A/S, Lynge (DK)

(*) Notice: Subject to any disclaimer, the term of this patent is extended or adjusted under 35 U.S.C. 154(b) by 0 days.

(21) Appl. No.: 14/950,686

(22) Filed: Nov. 24, 2015

(65) Prior Publication Data
US 2016/0080877 A1    Mar. 17, 2016

Related U.S. Application Data

(63) Continuation-in-part of application No. PCT/EP2013/062341, filed on Jun. 14, 2013.

(51) Int. Cl.
| | | |
|---|---|---|
| H04R 25/00 | (2006.01) | |
| H04M 1/725 | (2006.01) | |
| H04W 4/00 | (2009.01) | |
| H04W 76/02 | (2009.01) | |

(52) U.S. Cl.
CPC ...... *H04R 25/554* (2013.01); *H04M 1/72591* (2013.01); *H04R 25/552* (2013.01); *H04W 4/008* (2013.01); *H04W 76/023* (2013.01); *H04R 25/558* (2013.01); *H04R 2225/55* (2013.01); *H04R 2460/03* (2013.01)

(58) Field of Classification Search
CPC .. H04R 25/554; H04R 25/552; H04R 25/558; H04R 2225/55; H04R 2460/03; H04W 76/023; H04W 4/008; H04M 1/72591
USPC ............ 381/23.1, 312; 455/41.1–41.3
See application file for complete search history.

(56) References Cited

U.S. PATENT DOCUMENTS

| | | | | |
|---|---|---|---|---|
| 8,300,864 | B2* | 10/2012 | Mullenborn | H04R 25/554 381/312 |
| 8,422,705 | B2* | 4/2013 | Kilsgaard | H04R 25/554 381/312 |
| 2010/0184383 | A1* | 7/2010 | Lerke | H04R 25/552 455/66.1 |
| 2011/0059696 | A1* | 3/2011 | Rasmussen | H04R 25/552 455/41.1 |
| 2012/0117401 | A1 | 5/2012 | Gobriel et al. | |
| 2012/0121095 | A1 | 5/2012 | Popovski et al. | |
| 2012/0195449 | A1 | 8/2012 | Thiede et al. | |
| 2012/0310395 | A1 | 12/2012 | El-Hoiydi | |
| 2015/0312684 | A1* | 10/2015 | Knudsen | H04B 5/0075 381/23.1 |

OTHER PUBLICATIONS

International Search Report for PCT/EP2013/062341 dated Jul. 29, 2013 with Written Opinion of the International Searching Authority.

\* cited by examiner

*Primary Examiner* — David Ton
(74) *Attorney, Agent, or Firm* — Sughrue Mion, PLLC

(57) ABSTRACT

A method of operating a binaural hearing aid system (100) comprises an auxiliary device, wherein the hearing aids and the auxiliary device are wirelessly connected in a wireless network and wherein the power consumption is significantly reduced by having one hearing aid assuming the role of a passive slave in the wireless network. The invention further provides a binaural hearing aid system (100).

17 Claims, 1 Drawing Sheet

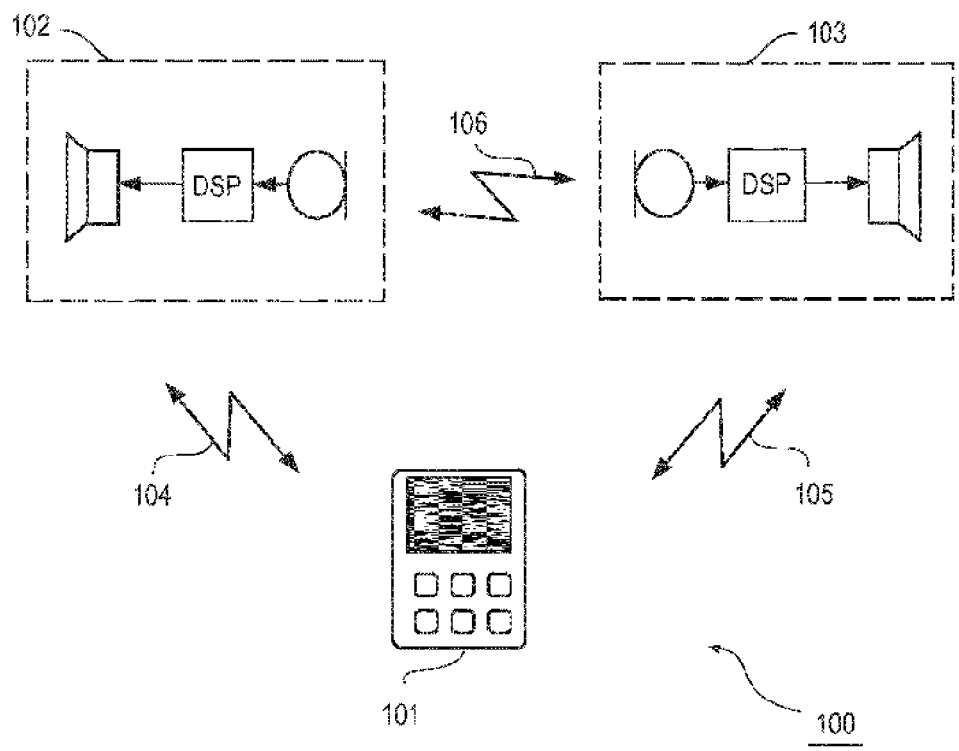

METHOD OF OPERATING A BINAURAL HEARING AID SYSTEM AND A BINAURAL HEARING AID SYSTEM

RELATED APPLICATIONS

The present application is a continuation-in-part of application PCT/EP2013/062341, filed on 14 Jun. 2013, in Europe, and published as WO 2014198328 A1.

BACKGROUND OF THE INVENTION

Field of the Invention

The present invention relates to a method of operating a binaural hearing aid system. The present invention more specifically relates to a method directed at reducing the power consumption of a binaural hearing aid system. The invention also relates to a binaural hearing aid system.

Within the present disclosure a hearing aid system is generally understood as meaning any system which provides an output signal that can be perceived as an acoustic signal by a user, or contributes to providing such an output signal, and which has means which are used to compensate an individual hearing loss of the user or contribute to compensating the hearing loss of the user or contribute to compensating the hearing loss. A binaural hearing aid system according to the present invention always comprises two hearing aids, one for each ear of the hearing aid user. The binaural hearing aid system may also comprise a remote control.

Furthermore, devices whose main aim is not to compensate for a hearing loss, for example consumer electronic devices (televisions, hi-fi systems, mobile phones, MP3 players etc.), may also be considered part of a binaural hearing aid system, provided they have measures for compensating for an individual hearing loss.

Within the present context a hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor, and an acoustic output transducer. The signal processor is preferably a digital signal processor (DSP). The hearing aid is enclosed in a casing suitable for fitting behind or in a human ear.

Thus within the present context the term "hearing aid system device" may denote a hearing aid or an auxiliary device.

Auxiliary devices such as e.g. remote controls or smart phones adapted for use with hearing aids are known. They offer a convenient way of operating various user-accessible features of a hearing aid such as volume level and program selection. However, in order to enable a hearing aid to receive a command from an auxiliary device significant power consumption may be required.

It is therefore a feature of the present invention to provide a method of operating a binaural hearing aid system comprising an auxiliary device that can reduce power consumption without sacrificing performance.

It is another feature of the present invention to provide a binaural hearing aid system with reduced power consumption.

SUMMARY OF THE INVENTION

The invention, in a first aspect, provides a method of operating a binaural hearing aid system comprising the steps of providing a first hearing aid, a second hearing aid and an auxiliary device; establishing a first short range data connection between said first hearing aid and said auxiliary device including the exchange of first connection information; using said first hearing aid to transmit data to said auxiliary device in order to maintain said first short range data connection receiving the first connection information in said second hearing aid; using said first connection information to enable said second hearing aid to receive data transmitted over said first short range data connection without having to transmit acknowledgement data to said auxiliary device in order to maintain said first short range data connection.

This provides a method of operating a binaural hearing aid system with reduced power consumption.

The invention, in a second aspect, provides a binaural hearing aid system comprising a first hearing aid, a second hearing aid and an auxiliary device; a wireless link adapted to allow wireless data exchange between the auxiliary device and the hearing aids; wherein the first hearing aid and the auxiliary device are adapted to establish a first short range data connection by the exchange of first connection information; wherein said first hearing aid is further adapted to transmit data to said auxiliary device in order to maintain said first short range data connection; wherein said auxiliary device is adapted to maintain said first short range data connection in response to receiving said data from said first hearing aid; wherein one of the auxiliary device and the first hearing aid is adapted to transmit said first connection information to said second hearing aid; wherein said second hearing aid is adapted to use said first connection information to receive data transmitted over said first short range data connection.

This provides binaural hearing aid system comprising an auxiliary device and having reduced power consumption.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings:

FIG. 1 illustrates highly schematically a binaural hearing aid system according to a first embodiment of the invention.

DETAILED DESCRIPTION

Reference is first made to FIG. 1, which illustrates highly schematically a binaural hearing aid system according to a first embodiment of the invention. The binaural hearing aid system 100 comprises an auxiliary device 101, a first hearing aid 102 and a second hearing aid 103.

According to the first embodiment of the present invention an auxiliary device 101, a first hearing aid 102, adapted to be worn in or at a first ear of the user, and a second hearing aid 103, adapted to be worn in or at a second ear of the user, are positioned within range of each other using wireless link means, operating at 2.4 GHz, or in variations in the range between 0.5 and 6 GHz, accommodated in each of the devices, whereby wireless connections 104, 105 and 106 are provided. The devices are further set up to communicate using the Bluetooth version 4 protocol, also known as Bluetooth Low Energy or Bluetooth Smart and standardized by the Bluetooth Special Interest Group. In variations other wireless link means and corresponding connection based protocols such as e.g. HomeRF, DECT or wireless LAN can be used.

Initially the first hearing aid 102 is set up to act as an active Bluetooth slave, the second hearing aid 103 is set up to act as a passive Bluetooth slave and the auxiliary device 101 is set up to act as the Bluetooth master (this may also be denoted the initiator). The setting up will be carried out when turning on the hearing aids and the auxiliary device respectively. In variations the hearing aid system devices (i.e. the hearing aids and the auxiliary device) are set up to assume their predefined role in the Bluetooth network in response to an activation of one or more specific actuator means, such as e.g. a button, positioned on the auxiliary device and/or at least one of the hearing aids. In both cases the predefined roles are programmed into the hearing aids and the auxiliary device during an adjustment carried out by the hearing aid fitter. In variations the predefined roles may be programmed as part of the hearing aid system manufacturing. In a further variation the predefined role of the auxiliary device may be downloaded to the auxiliary device as a small application program, e.g. a so-called "app".

In accordance with the Bluetooth protocol the procedure for connecting the hearing aids and the auxiliary device is carried out by having the active slave 102 broadcast an advertise signal and having the master 101 transmit a connection request back to the active slave 102 in response to said signal. The active slave 102 receives the connection request and transmits a connection response back to the master 101, and the connection between the active slave 102 and the master 101 is established once the master receives this connection response.

When the connection is established the necessary connection information is provided to the active slave 102, the connection information comprising details of the frequency channels and the timing that the master 101 will use to transmit data. By having the active slave 102 sharing the connection information with the passive slave 103, the passive slave 103 will be able to listen in to the transmissions from the master 101 without having to respond. According to the embodiment of FIG. 1 the active slave 102 transmits the connection information to the passive slave 103 using a wireless link between the two hearing aids.

In variations of the FIG. 1 embodiment the passive slave simply listens in on the advertise channel used to transmit both the advertise signal from the active slave and the connection request from the master. Hereby the passive slave can obtain the connection information without requiring the active slave to transmit this information to the passive slave, whereby a wireless link between the two hearing aids is not necessary in order to provide the connection information to the passive slave. This variation requires that device information for the active slave is programmed into the passive slave, whereby the passive slave is able to recognize the active slave among a possible multitude of advertising devices.

According to the FIG. 1 embodiment the device identification is the hearing aid serial number. In variations other types of device identification may be employed all of which will be obvious for a person skilled in the art.

In yet another variation the master is set up to initially establish a second short range connection with the passive slave and use this connection to provide the first connection information to the passive slave, whereby a wireless link between the two hearing aids is not necessary in order to provide the first connection information to the passive slave. After having received said first connection information the passive slave abandons the second short range connection and starts to listen in on said first short range connection.

In a further variation the master may provide a third connection information to the active slave using the first short range connection and to the passive slave using the second short range connection. After having received said third connection information the active slave abandons the first short range connection and establishes a third short range connection with the auxiliary device using said third connection information and the passive slave abandons the second short range connection and starts to listen in on said established third short range connection.

In accordance with the Bluetooth protocol the active slave is required to respond to the transmissions from the master in order to refresh or maintain the connection.

Thus according to the inventive concept of the present invention the master device only sees and maintains one connection, namely with the active slave as opposed to having to maintain a connection with both the active and the passive slave, whereby a significant amount of processing power is saved by the master device. Further and even more important the passive slave also saves a significant amount of power since it is not required to respond to the transmissions from the master 101 in order to maintain the connection between the two.

It should be appreciated that this method of operating a system with three independent devices is especially advantageous for a binaural hearing aid system because much of the data transmitted from the master is either data whose only purpose is to maintain the connection or is data that is adapted to trigger the same specific effect in both hearing aids at the same time. Thus most of the time the data, to be transmitted to the two hearing aids, are the same.

Thus within the present context data can be adapted both to maintain a short range data connection and to trigger a specific effect in the hearing aid.

Examples of data that are relevant for both hearing aids at the same time includes data representing commands for changing volume, for changing a hearing aid program, for changing some other hearing aid setting, for streaming a telephone call or for streaming of audio such as e.g. music. In streaming of stereo music the hearing aids are typically set up to each receive a stereo signal and then extract the left or right stereo signal, as applicable.

Common for all of the above types of information is that a typical user will transmit this type of information from the auxiliary device only for a limited duration of time during a normal day. Therefore the power saved by the passive device not having to respond to the transmissions from the master is significant.

However, even though the connection between the master and the active slave generally is in an idle state with respect to transmission of hearing aid data that triggers an event in the active slave, this does not mean that the time interval between transmissions from the master can be increased accordingly. This is because the hearing aids must be capable of reacting fast in response to a transmission from the master e.g. signaling an incoming telephone call or requiring a change of volume or program. This means that the time interval between transmissions from the master, and therefore also the time interval between acknowledgement transmissions from the active slave, is generally less than 10 seconds, preferably less than 1 seconds, more preferably less than half a second and even more preferably less than 250 milliseconds. According to a variation of the present embodiment the master can adapt the time interval dependent on the current hearing aid program, such that e.g. a program adapted to be used during sleep may have long time intervals, since the response time to e.g. a transmission of a wake-up alarm from the master is not critical.

In variations the auxiliary device may be a hearing aid remote control or a smart phone adapted to communicate wirelessly with a hearing aid system.

In other variations the wireless link may be based on inductive communication operating in the range between 1 and 20 MHz, preferably around 10 MHz.

In yet other variations the wireless link enabling the communication between the auxiliary device and the hearing aids is operated at a frequency around 2.4 GHz, or in the range between 500 MHz and 6 GHz, and the wireless link enabling the communication between the hearing aids is based on inductive communication operating in the range between 1 MHz and 20 MHz, preferably around 10 MHz.

According to a further advantageous embodiment of the present invention the two hearing aids alternate taking turns on assuming the role of the active slave. In this way the power saved by each of the two hearing aids can be approximately the same and the battery drain can be equalized, which significantly facilitates the battery replacement procedure for the hearing aid user because it allows the batteries for the two hearing aids to be replaced at the same time.

According to a specific variation of the present invention the two hearing aids can take turns on assuming the role of the active slave by having each of the hearing aids respond only to every second transmission from the master hereby still ensuring that the master receives a response to every transmission.

According to yet another variation of the present embodiment the two hearing aids are connected using an inductive wireless link and a low latency data communication protocol. The hearing aids can, in addition to taking turns on assuming the role of active slave, also take turns on listening to the transmissions from the master whereby even more power can be saved. In case information transmitted from the master comprises information that requires the hearing aids to act then the hearing aid receiving the information can relay the information to the other hearing aid using the low latency data channel and inductive wireless link.

In case a slave detects that transmissions from the master are no longer received as expected and therefore that the connection with the master has been interrupted, the active slave will initiate the procedure for connecting the hearing aids and the auxiliary device. This procedure has already been described above and comprises having the active slave broadcast an advertise signal until the master transmits a connection request back to the active slave.

According to a preferred embodiment the two hearing aids are set up to also taking turns assuming the role of active slave during the process of establishing the connection with the master, and therefore having to transmit the advertise signals, whereby the reduction in power consumption resulting from only having one of the hearing aids transmit the advertise signals is shared between the hearing aids, whereby the battery replacement procedure is significantly facilitated for the hearing aid user because it allows the batteries for the two hearing aids to be replaced at the same time.

We claim:

1. A method of operating a binaural hearing aid system comprising the steps of:
   providing a first hearing aid, a second hearing aid and an auxiliary device;
   establishing a first short range data connection between said first hearing aid and said auxiliary device including the exchange of first connection information;
   using said first hearing aid to transmit data to said auxiliary device in order to maintain said first short range data connection;
   receiving the first connection information in said second hearing aid;
   using said first connection information to enable said second hearing aid to receive data transmitted over said first short range data connection without having to transmit acknowledgement data to said auxiliary device in order to maintain said first short range data connection.

2. The method according to claim 1, wherein said connection information is defined by a protocol selected from a group of protocols comprising at least the protocols defined by a Bluetooth standard.

3. The method according to claim 2, wherein said Bluetooth standard is version 4.

4. The method according to claim 1, comprising the step of transmitting said first connection information from said first hearing aid and to said second hearing aid.

5. The method according to claim 4, wherein said step of transmitting said first connection information from said first hearing aid and to said second hearing aid is carried out using an inductive wireless link.

6. The method according to claim 1, comprising the steps of:
   establishing a second short range data connection between said second hearing aid and said auxiliary device; and
   transmitting said first connection information using said second short range data connection.

7. The method according to claim 1, comprising the steps of:
   programming said second hearing aid with device information allowing the second hearing aid to recognize said first hearing aid during the process of establishing said first short range connection;
   using said device information to enable the second hearing aid to obtain the first connection information from the auxiliary device when the auxiliary device transmits the first connection information to the first hearing aid as part of the step of establishing the first short range data connection between the first hearing aid and the auxiliary device.

8. The method according to claim 1, comprising the further steps of:
   ceasing to use said first hearing aid to transmit data to said auxiliary device, in order to maintain said first short range data connection, and using instead said second hearing aid to transmit said data, hereby maintaining said first short range data connection.

9. The method according to claim 1, comprising the further step of:
alternating between using either the first hearing aid or the second hearing aid to transmit data to said auxiliary device, hereby providing that said first short range data connection is maintained and providing that the resulting power load by transmitting the data required to maintain a short range data connection is shared between the first hearing aid and the second hearing aid.

10. The method according to claim 1 comprising the further step of providing a wireless link, operating at a frequency in the range between 500 MHz and 6 GHz, between said auxiliary device and said first hearing aid and between said auxiliary device and said second hearing aid.

11. The method according to claim 10 wherein a frequency of around 2.4 GHz is selected for operating said wireless link.

12. The method according to claim 1, wherein the data representing information adapted to invoke a specific effect in a hearing aid is selected from a group of effects comprising: changing hearing aid program, adjusting hearing aid volume or using the hearing aid to convert data representing audio into sound.

13. The method according to claim 1, wherein said first connection information includes information regarding channel and timing information the auxiliary device will use to transmit data to said first hearing aid.

14. A binaural hearing aid system comprising
a first hearing aid, a second hearing aid and an auxiliary device;
a wireless link adapted to allow wireless data exchange between the auxiliary device and the hearing aids;
wherein the first hearing aid and the auxiliary device are adapted to establish a first short range data connection by the exchange of first connection information;
wherein said first hearing aid is further adapted to transmit data to said auxiliary device in order to maintain said first short range data connection;
wherein said auxiliary device is adapted to maintain said first short range data connection in response to receiving said data from said first hearing aid;
wherein one of the auxiliary device and the first hearing aid is adapted to transmit said first connection information to said second hearing aid;
wherein said second hearing aid is adapted to use said first connection information to receive data transmitted over said first short range data connection.

15. The binaural hearing aid system according to claim 14, wherein said wireless link comprises:
a wireless link, operating in the range between 500 MHz and 6 GHz, between said auxiliary device and said first hearing aid and between said auxiliary device and said second hearing aid.

16. The binaural hearing aid system according to claim 14, wherein said wireless link comprises:
an inductive wireless link, operating in the range between 1 MHz and 20 MHz, between said first hearing aid and said second hearing aid of the binaural hearing aid system.

17. The binaural hearing aid system according to claim 14, wherein said first connection information includes information regarding channel and timing information the auxiliary device will use to transmit data to said first hearing aid.

* * * * *